United States Patent
Lorca Hernando

(10) Patent No.: US 9,602,323 B2
(45) Date of Patent: Mar. 21, 2017

(54) METHOD FOR INCREASING COVERAGE AND ROBUSTNESS AGAINST FREQUENCY OFFSETS IN WIRELESS NETWORKS, USER DEVICE AND COMPUTER PROGRAMS THEREOF

(71) Applicant: Telefonica, S.A., Madrid (ES)

(72) Inventor: Javier Lorca Hernando, Madrid (ES)

(73) Assignee: Telefonica, S.A., Madrid (ES)

( * ) Notice: Subject to any disclaimer, the term of this patent is extended or adjusted under 35 U.S.C. 154(b) by 44 days.

(21) Appl. No.: 14/722,815

(22) Filed: May 27, 2015

(65) Prior Publication Data

US 2015/0358193 A1 Dec. 10, 2015

(30) Foreign Application Priority Data

May 28, 2014 (EP) .................................... 14382197

(51) Int. Cl.
*H04L 27/26* (2006.01)
*H04W 4/00* (2009.01)

(52) U.S. Cl.
CPC ...... *H04L 27/2695* (2013.01); *H04L 27/2643* (2013.01); *H04L 27/2657* (2013.01); *H04W 4/005* (2013.01)

(58) Field of Classification Search
CPC . H04J 2211/006; H04B 7/208; H04B 7/2621; H04B 7/2665
See application file for complete search history.

(56) References Cited

FOREIGN PATENT DOCUMENTS

WO 2013/122431 A1 8/2013

OTHER PUBLICATIONS

Robert Love et al., "Uplink Physical Layer Design", LTE—The UMTS Long Term Evolution: From Theory to Practice, Jan. 1, 2011, pp. 317-326, 2nd Ediction, Chapter 14, XP-002734660.
European Search Report of EP14382197.3 dated Jan. 20, 2015.

*Primary Examiner* — Alvin Zhu
(74) *Attorney, Agent, or Firm* — Sughrue Mion, PLLC

(57) ABSTRACT

A Method for increasing coverage and robustness against frequency offsets in wireless networks, user device and computer program products
In the method, a user device (171) that wirelessly communicates with a base station (172) through a wireless network employing a Single Carrier-Frequency Division Multiple Access, SC-FDMA, comprises: applying a number of calculated repetitions of a block of complex information symbols prior to a SC-FDMA modulator (176), said number of repetitions being an integer submultiple of a number of subcarriers scheduled for uplink transmission according to the expression: $N_{sc}^{UL}=L \times M$ with L and M integers; and applying, when mapping to scheduled resources in the SC-FDMA modulator (176), a frequency shift equal to a subcarrier width multiplied by one half of said number of repetitions.

14 Claims, 13 Drawing Sheets

*The spectrum can be viewed as being sampled with period L' = gcd (N,L) < L*

METHOD FOR INCREASING COVERAGE AND ROBUSTNESS AGAINST FREQUENCY OFFSETS IN WIRELESS NETWORKS, USER DEVICE AND COMPUTER PROGRAMS THEREOF

CROSS REFERENCE TO RELATED APPLICATIONS

This application claims priority from European Patent Application No. EP 14382197.3 filed on May 28, 2014, the contents of all of which are incorporated herein by reference in their entirety.

FIELD OF THE INVENTION

The present invention generally relates to the field of wireless communications. In particular, the invention relates to a method, user device and computer programs for increasing coverage and robustness against large frequency offsets, in wireless networks employing Single-Carrier Frequency Division Multiple Access (SC-FDMA).

BACKGROUND OF THE INVENTION

Long-Term Evolution (LTE) is the next step in cellular Third-Generation (3G) systems, which represents basically an evolution of present mobile communications standards, such as Universal Mobile Telecommunication System (UMTS) and Global System for Mobile Communications (GSM) [1]. It is a Third Generation Partnership Project (3GPP) standard that provides throughputs up to 50 Mbps in uplink and up to 100 Mbps in downlink. It uses scalable bandwidth from 1.4 to 20 MHz in order to suit the needs of network operators that have different bandwidth allocations. LTE is also expected to improve spectral efficiency in networks, allowing carriers to provide more data and voice services over a given bandwidth.

One of the growing fields of interest in 3GPP cellular technologies is Machine-Type Communications (MTC) [2]. MTC refers to the type of traffic generated by (or directed to) a number of connected machines (such as remote sensors, vending machines, vehicles, and so on) in a given cell, and the possible enhancements in coverage and capacity required for the support of large numbers of such devices. MTC requirements are addressed by 3GPP since Release 8, focusing on GSM and UMTS [3], but LTE has also paid attention to MTC in Release 10 and Release 11 [4] [5] [6]. MTC traffic is characterized by having very low bit rate requirements (of the order of few hundreds of bps), high latencies (of the order of minutes), and a possibly large number of almost inactive devices camped in a single cell.

In order to turn LTE into a cost-effective solution for MTC, studies on how to improve the radio access network procedures for MTC devices are performed in Release 11. Release 12 foresees several mechanisms to extend the coverage and reduce device cost [7], and additional studies are also conducted in order to reduce layer-3 signaling overhead, as well as to increase battery saving through delayed transmissions and the introduction of extended Discontinuous Reception (DRX) cycles [11].

The limiting link in terms of coverage for wireless mobile communication systems is usually the uplink due to limited device transmit power. In order to minimize uplink coverage issues, LTE employs a modified flavour of Orthogonal Frequency Division Multiplexing (OFDM), namely Single-Carrier Frequency Division Multiple Access (SC-FDMA), also known as Discrete Fourier Transform-Spread-Orthogonal Frequency Division Multiplexing (DFT-S-OFDM). SC-FDMA benefits from reduced peak-to-average power ratio (PAPR), therefore power amplifiers are allowed to work with higher efficiency than in OFDM, which in turn prolongs battery life. However proper solutions are still required for MTC devices in poor coverage conditions, as dramatic improvements would be needed for devices with very low transmit power.

In addition, MTC devices are low-cost, low-power devices with limited processing capabilities. One of the most critical issues in OFDM and SC-FDMA comes from the large frequency stability required by the transmissions, which in turn precludes the use of poor local oscillators at the device.

Solutions for coverage enhancements do exist for MTC, most of them consisting in the application of a fixed pattern of packet retransmissions for increased reliability [9]. The drawback of this approach is the increased resource occupation time required for a given information block, as the number of retransmissions is fixed (and usually high) in order to avoid dynamic acknowledgements from the base station. In addition, it does not support large frequency offsets and thus precludes the use of inexpensive local oscillators for MTC.

Other alternatives for coverage extension include reduction of the scheduled bandwidth to very few subcarriers, lower than one resource block (RB), therefore increasing the Signal to Noise Ratio (SNR) [10]. The drawback of this approach is that it very much complicates uplink scheduling in the sub-RB scale, while not introducing any protection for large frequency offsets as the subcarrier spacing would be unchanged.

There are also other proposals disclosing low rate coding or repetition coding, such as document [10] or patent application US-A1-2010/0239046, which are essentially similar in performance to increasing the number of retransmissions.

More specific solutions for enhancing uplink coverage and frequency offset robustness are therefore needed in order to enable the deployment of massive numbers of MTC devices employing SC-FDMA modulation.

REFERENCES

[1] 3GPP TS 36.300, Evolved Universal Terrestrial Radio Access (E-UTRA) and Evolved Universal Terrestrial Radio Access Network (E-UTRAN); Overall Description, Stage 2 (Release 8)
[2] 3GPP TR 23.888, "System improvements for Machine-Type Communications (MTC)"
[3] 3GPP TR 22.868 (March 2007), "Facilitating Machine to Machine Communication in 3GPP Systems"
[4] 3GPP TS 22.368, "Service requirements for Machine-Type Communications (MTC)"
[5] 3GPP TR 37.868 (September 2011), "Study on RAN Improvements for Machine-type Communications"
[6] 3GPP TR 36.888 v2.0.0 (June 2012), "Study on provision of low-cost MTC UEs based on LTE"
[7] 3GPP TSG RAN #57, RP-121441 "Study Item on the provision of low-cost MTC UEs based on LTE", Vodafone
[8] S. Sesia, I. Toufik, M. Baker (editors), "LTE, the UMTS Long Term Evolution: From Theory to Practice" (2nd edition), John Wiley & Sons, 2011, pp. 319-320.

[9] 3GPP TSG RAN WG1 #72, R1-130462 "Feasibility of coverage extension of physical channels for MTC devices", Alcatel-Lucent, Alcatel-Lucent Shanghai Bell

[10] 3GPP TSG RAN WG1 #72bis, R1-130888 "Coverage analysis and evaluation on PDSCH/PUSCH and Reference Signals for low-cost MTC UEs", Huawei, HiSilicon

[11] 3GPP TR 37.869 v0.2.0 (April 2013), "Study on Enhancements to Machine-Type Communications (MTC) and other Mobile Data Applications; Radio Access Network (RAN) aspects"

[12] J. van de Beek, M. Sandell, P. O. Börjesson, "ML Estimation of Time and Frequency Offset in OFDM Systems", IEEE Trans. Signal Proc., vol. 45 (7), July 1997

DESCRIPTION OF THE INVENTION

To that end, according to a first aspect there is provided a method for increasing coverage and robustness against frequency offsets in wireless networks such as a Long-Term Evolution network, wherein at least one user device wirelessly communicates with at least one base station through a wireless network employing a Single Carrier-Frequency Division Multiple Access, SC-FDMA. In a characteristic manner and on contrary of the known proposals, in the method the at least one user device applies a number of calculated repetitions of a block of complex information symbols prior to a SC-FDMA modulator, said number of repetitions being an integer submultiple of a number of subcarriers scheduled for uplink transmission according to the expression:

$$N_{sc}^{UL} = L \times M \text{ with } L \text{ and } M \text{ integers,}$$

where $N_{sc}^{UL}$ is said number of subcarriers scheduled for uplink transmission, L is said number of repetitions and M is said number of complex information symbols; and applies, when mapping to scheduled resources in the SC-FDMA modulator, a frequency shift equal to a subcarrier width multiplied by one half of said number of repetitions.

In the proposed method, the greatest common divisor of said number of repetitions and the SC-FDMA symbol length is maximized according to the expression:

$$\gcd(N,L) \text{ is maximized,}$$

where L is said number of repetitions, N is the SC-FDMA symbol length and gcd is the greatest common divisor operation.

In addition, the base station in the proposed method performs the following steps to detect a time-domain received signal from the user device:

applies a frequency shift over said received time-domain signal by multiplying the latter with a complex factor w[n] given by:

$$w[n] = \exp\left(-j2\pi \frac{\Delta}{N} n\right),$$

wherein: $\Delta$ is the frequency difference between the centre of uplink resources and the central DC subcarrier, said difference being measured as a number of subcarriers in the digital domain, n is the index of the digital samples in the time domain, and N is the length of the SC-FDMA symbols;

calculates a widening factor L' given by: L'=gcd(L,N), where gcd is the greatest common divisor operation, L is the number of repetitions and N is the length of the SC-FDMA symbols;

divides the received SC-FDMA symbol into L' identical blocks of N/L' samples each, and estimates a frequency offset in the digital domain from the expression:

$$\Delta \hat{f}_{off} = -\frac{L'}{2\pi} \text{Phase}\left\{ \sum_{n=0}^{CP+N-N/L'-1} r[n] r^*[n+N/L'] \right\},$$

and with a maximum allowed frequency offset:

$$\Delta f_{off,max} = \pm L' \times \frac{\Delta f}{2},$$

where $\Delta \hat{f}_{off}$ is the estimated frequency offset, $\Delta f_{off,max}$ is the maximum allowed frequency offset, r[n] represents the received samples in the time domain, CP is the length of the cyclic prefix, $\Delta f$ is the subcarrier width and * denotes the conjugation operation;

sums together the time-domain samples corresponding to said L' blocks of N/L' samples to form a single block of N/L' samples with improved detection characteristics;

pads said single block of N/L' samples with the necessary zeros to perform an N-point discrete Fourier transform;

detects the complex amplitudes of the widened subcarriers in the frequency domain; and performs an inverse M-point discrete Fourier transform of said detected complex amplitudes of the widened subcarriers to obtain the original M complex information symbols.

According to an embodiment, the base station after calculating said number of repetitions L reports the latter to the user device, by means of a specific control message or as a part of an existing control message. In addition, the user device sends a list of supported values of the number of repetitions L to the base station as part of an initial access to the wireless network.

According to some embodiments, the user device may report to the base station a preferred value of the number of repetitions L, a maximum expected frequency offset, a minimum bit rate requirement, or combinations thereof.

The proposed method is especially suitable for MTC devices where low bit rates and high latencies are foreseen. In addition, the method increases coverage by concentrating the energy into a subset of the subcarriers reserved for the user without compromising the single-carrier nature of the modulation, and in conjunction with the novel processing steps at the receiver, it allows for increased protection against frequency offsets which are larger than half the subcarrier width (15 kHz). Both characteristics allow inexpensive MTC devices to operate with low transmit powers and/or poor frequency stabilities of the local oscillators. Moreover, the method would not impact legacy non-MTC devices.

According to a second aspect there is provided a user device which is configured to wirelessly communicate with at least one base station through a wireless network employing a Single Carrier-Frequency Division Multiple Access, SC-FDMA. In a characteristic manner the user device includes:

means for applying a number of calculated repetitions of a block of complex information symbols prior to a SC-FDMA modulator, said number of repetitions being an integer submultiple of a number of subcarriers scheduled for uplink transmission according to the expression:

$$N_{sc}^{UL} = L \times M \text{ with } L \text{ and } M \text{ integers,}$$

where $N_{sc}^{UL}$ is said number of subcarriers scheduled for uplink transmission, L is said number of repetitions and M is said number of complex information symbols; and means for applying, when mapping to scheduled resources in the SC-FDMA modulator, a frequency shift equal to a subcarrier width multiplied by one half of said number of repetitions, so that coverage of the user device (171) in the wireless network and frequency offset robustness against frequency offsets is increased.

According to an embodiment, the proposed user device also includes means for receiving from the at least one base station, through a specific control message or as a part of an existing control message, the number of calculated repetitions L. Besides, the user device may also include means for reporting to the base station a preferred value of said number of repetitions L, a maximum expected frequency offset and/or a minimum bit rate requirement.

The proposed user device preferably is a Machine-Type Communications device, MTC.

In a yet further aspect, the present invention may provide a computer program configured when executed by a processor to cause the processor to perform the method of any of the claims of the present invention described herein. Optionally, there may be provided a computer-readable medium comprising instructions forming this computer program. Additionally or alternatively, the present invention may be found in programmable logic configured to perform the method of any of the aspects of the present invention described herein.

The invention is applicable to any wireless communications system employing SC-FDMA for use by MTC devices, where lower cost and transmit power limitations may lead to significant restrictions in terms of uplink coverage and maximum allowed frequency offset. The invention allows increasing coverage and robustness against large frequency offsets as compared to prior art solutions, at the cost of reducing the effective bit rate for a given bandwidth. MTC devices however do not have tight requirements for bit rate or delays, therefore allowing trading bit rates for coverage and frequency offset robustness.

The changes proposed in SC-FDMA transmission and reception process do not compromise the single-carrier nature of the signals, which is crucial in the uplink of MTC devices for increased battery life. Changes in transmission include repetitions and frequency shifts at baseband level, therefore presenting very low complexity. Changes in reception include specific processing stages so as to increase reliability of the signals and improve detection in case of large frequency offsets.

Compatibility with standard SC-FDMA is ensured by suitable signaling from the device, including also the possibility to report specific requirements such as preferred values for the repetition factor, expected coverage and frequency offset enhancements, or minimum bit rates, but not precluding others.

Finally, the proposed invention facilitates the pervasive presence of low-cost, low-power inexpensive machines connected through advanced cellular wireless system employing SC-FDMA, without the complex hardware that would otherwise be required for proper operation.

BRIEF DESCRIPTION OF THE DRAWINGS

The previous and other advantages and features will be more fully understood from the following detailed description of embodiments, with reference to the attached, which must be considered in an illustrative and non-limiting manner, in which.

DETAILED DESCRIPTION OF THE INVENTION AND OF SEVERAL EMBODIMENTS

Figure 1:
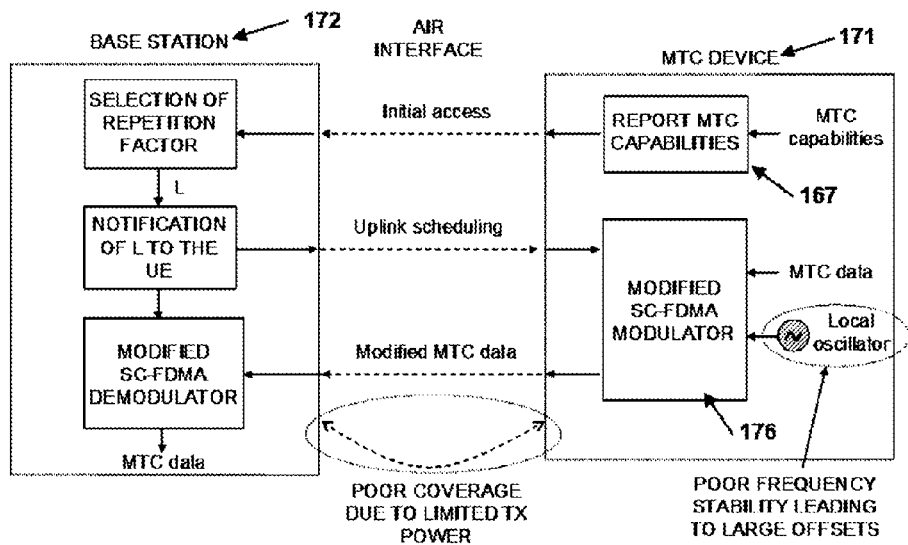
FIG. 1 illustrates the basis of the invention in the uplink of a wireless communication between a user device such as an MTC device and a base station.

FIG. 1 shows the rationale for the proposed invention in the uplink of a wireless communication between a user device 171, such as an MTC device, and a base station 172; the downlink case would be similar to the one described according to the ideas proposed in this invention. Upon initial access to the cell, the MTC device 171 would signal an indication of MTC capabilities via a reporting means 167 to the base station 172, in terms of increased coverage requirements, poor frequency stabilities and/or minimum bit rates. The base station 172 then schedules the necessary uplink resources, selects a suitable "repetition factor"

denoted by L and notifies it to the MTC device 171 through uplink scheduling. The information to be sent by a SC-FDMA baseband modulator 176 at the MTC device 171 is then modified according to the repetition factor for increased SNR and robustness against large frequency offsets, without any impact on other users and on the single-carrier nature of the uplink modulation. Upon reception, a novel procedure at the base station 172 allows detecting the uplink signal with increased SNR by a factor 10·log(L) dB, and also with frequency offsets up to $\pm \gcd(N,L) \times \Delta f/2$ where gcd stands for the greatest common divisor, N is the SC-FDMA symbol length and $\Delta f$ is the subcarrier width.

Figure 2:
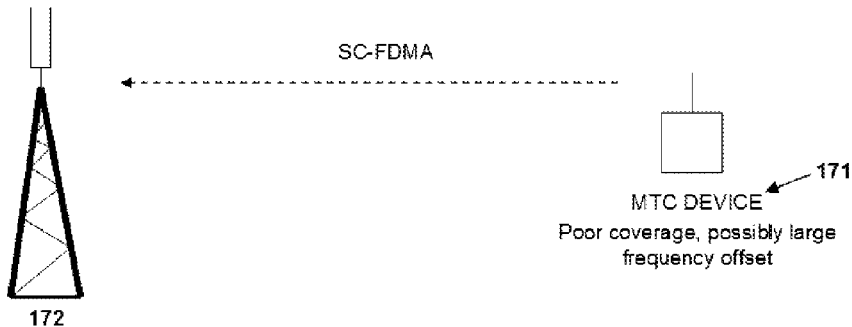
FIG. 2 illustrates a scenario for applicability of the proposed invention.

With reference to FIG. 2 it is illustrated a possible scenario for applicability of the invention. MTC devices 171 employing SC-FDMA in the uplink intend to communicate with the base station 172 even in very poor coverage conditions. In addition, poor frequency stability of the local oscillators can result in possibly large frequency offsets for the uplink received signal, thus preventing uplink detection if the offset is higher than half the subcarrier width.

SC-FDMA benefits from lower peak-to-average power ratio than OFDM while keeping the same desirable properties of multipath protection and multi-antenna support. It differs from OFDM by an additional discrete Fourier transform (DFT) that spreads the modulated symbols across the subcarriers. In the time domain, the SC-FDMA signal has single-carrier nature and comprises a number of complex symbols (QPSK, 16QAM or 64QAM) with a user-specific symbol rate determined by the bandwidth of the signal. In the frequency domain, the signal comprises a number of contiguous subcarriers with complex amplitudes given by the DFT operation.

The invention reduces the number of useful complex symbols to be included in a given uplink bandwidth by a factor L, completing the information block with L repetitions of M modulated symbols prior to the spreading (DFT) operation. The value L×M equals the number of subcarriers granted for the user in uplink, which in turn determines the resources to be scheduled by the base station 172. Therefore L is an integer submultiple of the number of subcarriers reserved for uplink transmission. Upon reception, changes proposed in this invention allow exploiting the unused subcarriers for enhanced detection, with coverage improved by a factor L compared to standard SC-FDMA. At the same time, it allows for increased protection against large frequency offsets by a factor gcd (N, L) compared to prior art, where gcd is the greatest common divisor operation and N is the SC-FDMA symbol length.

The fundamental changes proposed by this invention at both the transmitter (MTC device 171) and the receiver (base station 172) are described in what follows.

Figure 3:
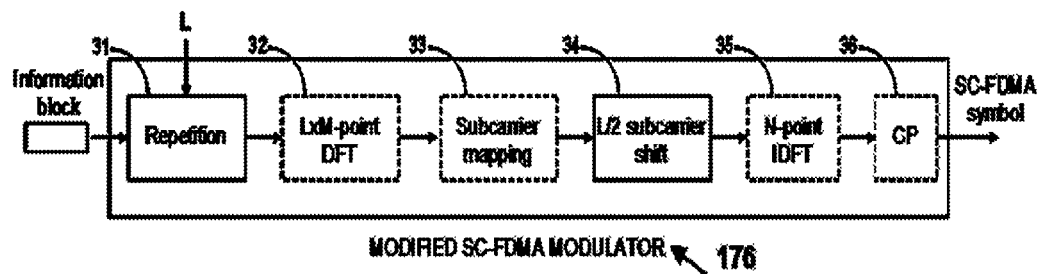
FIG. 3 illustrates the modified transmission chain for MTC devices proposed by the invention.
Figure 4:
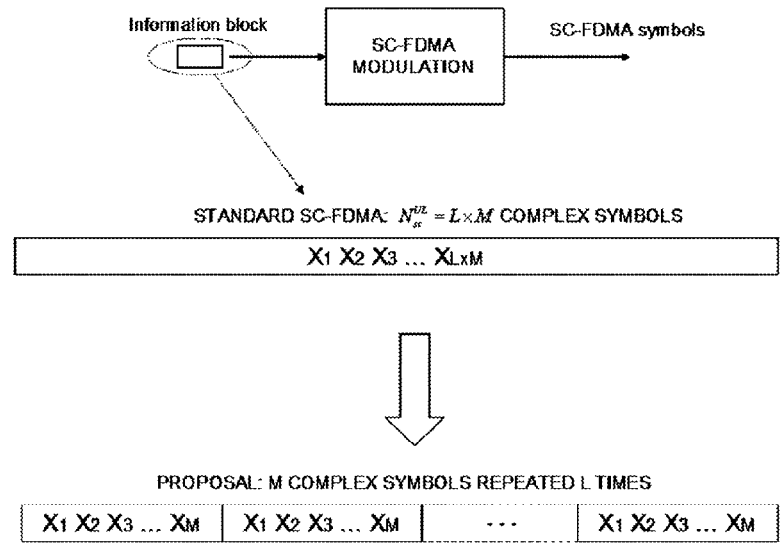
FIG. 4 is an example of the repetition of the complex information symbols prior to SC-FDMA modulation.

Detailed Transmitter Chain:

FIG. 3 shows an overview of the complete transmission chain as proposed in this invention for MTC devices 171, showing in solid lines the new blocks as opposed to prior-art blocks in dashed lines. The first repetition operation 31 is separately shown in FIG. 4, where M complex symbols are repeated L times so as to construct the information to be mapped over each SC-FDMA symbol. Prior art techniques modulate a block of $N_{sc}^{UL}$ complex symbols as given by the uplink scheduled bandwidth (where $N_{sc}^{UL}$ is the number of uplink scheduled subcarriers), and this invention splits it into L repetitions of M symbols, where L can be any suitable submultiple of the total number of complex symbols. Each complex symbol is previously obtained through suitable constellation mapping (e.g. using BPSK, QPSK, 16QAM or 64QAM, but not precluding any other constellation type). The value L can be reported by the base station 172 to the MTC device 171 through suitable control signaling.

Figure 5:
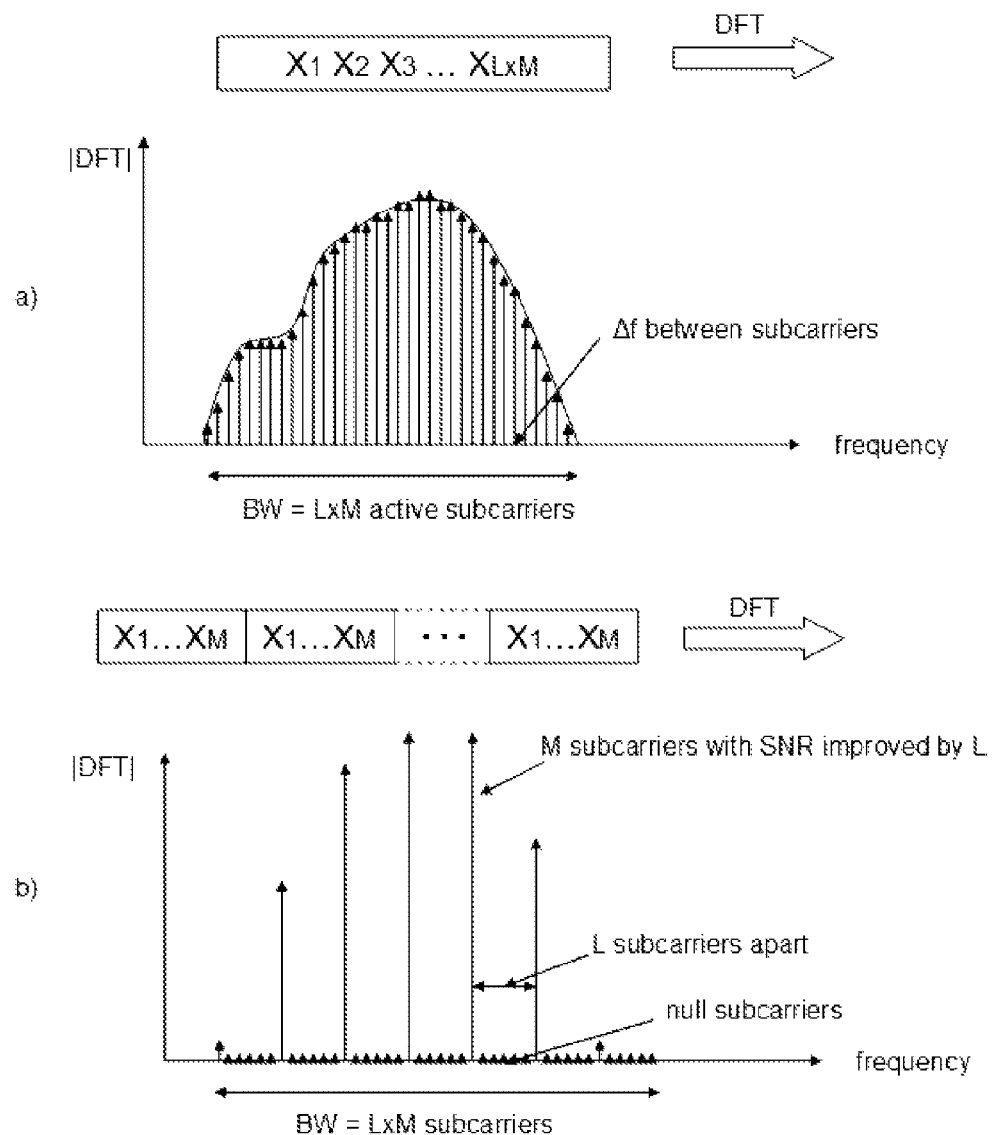
FIG. 5 illustrates a spectrum after the L×M-point DFT operation: a) prior art, b) proposal of this invention.

The amount of information available in each SC-FDMA symbol will thus be reduced by a factor L when compared to the case without repetition. The quantity L×M will be equal to the number of subcarriers granted for uplink transmission, therefore L is an integer submultiple of the number of scheduled subcarriers. The amount of useful information will thus be equal to M symbols, L times lower than otherwise available without repetition. After the L×M-point DFT 32, the repetition operation will be seen in the frequency domain as a concentration of power into lower number of subcarriers than in standard SC-FDMA. As the information to be sent is periodic, the DFT comprises M non-null subcarriers at digital frequencies which are multiples of L, with L−1 zeros between each pair of non-null subcarriers. FIG. 5 shows the resulting spectrum after the L×M-point DFT.

According to Parseval's theorem, the total power of the uplink signal in the time domain must be conserved in the frequency domain in spite of the additional null subcarriers, therefore increasing the peak level of the non-null subcarriers. Parseval's theorem for the above case states:

$$\sum_{n=0}^{L \times M-1} |x[n]|^2 = \frac{1}{L \times M} \sum_{k=0}^{L \times M-1} |X[k]|^2,$$

where x[n] is the signal in the time domain and X[k] the resulting spectrum in the frequency domain. The above equation results in an increased SNR of the non-null subcarriers by a factor equal to the repetition factor L in order to keep the total power unchanged. Therefore, $$SNR_{repetition} = L \times SNR_{no\_repetition},$$

coverage will thus be increased by a factor 10×log(L) in dB.

Figure 6:
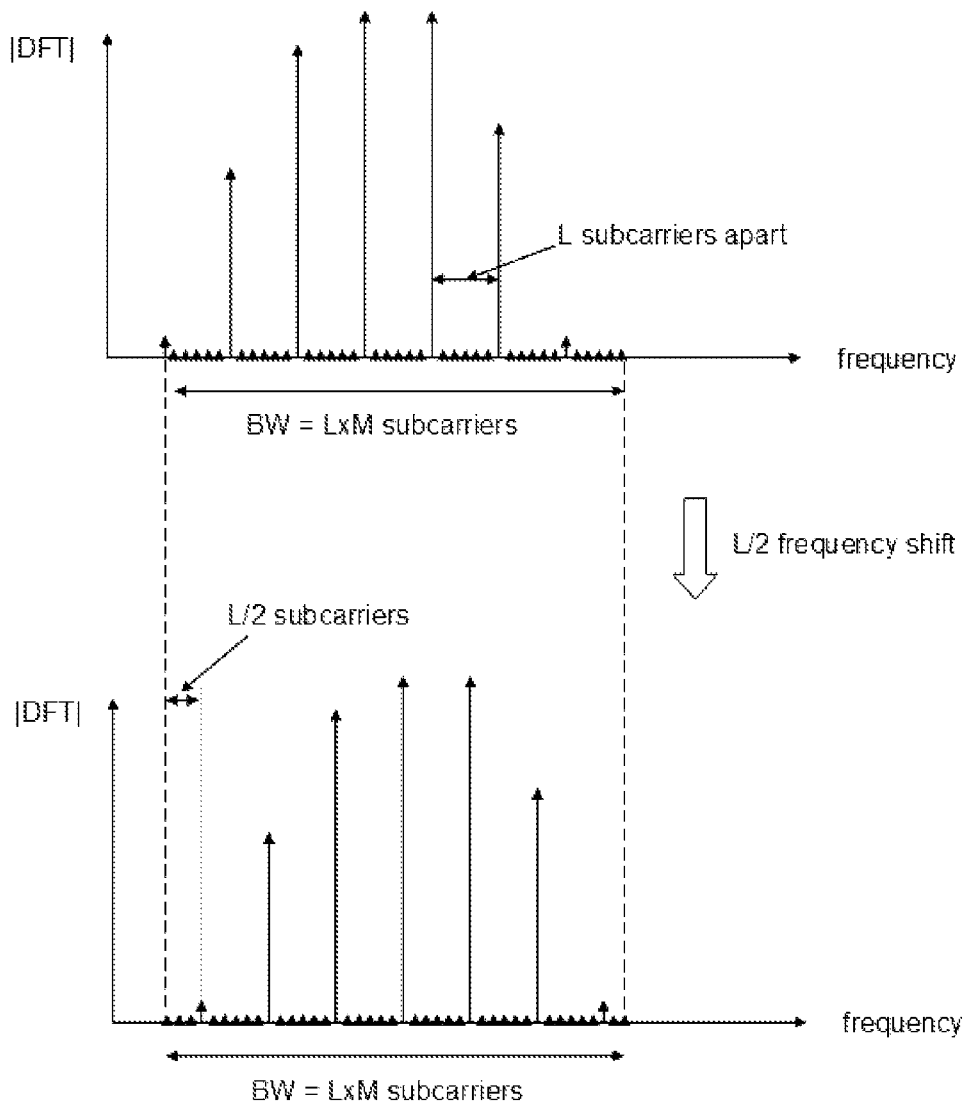
FIG. 6 is an example of a frequency shift of L/2 subcarriers.

The proposed procedure can also be viewed as a reduction in the length of the effective SC-FDMA symbol length in the time domain, which causes the subcarrier width to increase in the frequency domain. Repetition in the time domain further introduces a sampling operation in the frequency domain, thus leaving only M non-null subcarriers and increasing their SNR. This reduction in the SC-FDMA symbol length will additionally be exploited in reception for increased frequency robustness. After appropriate subcarrier mapping to frequency resources 33, a frequency shift of L/2 subcarriers is then applied for protection against large positive and negative frequency offsets 34. Subcarriers not used for transmission are set to zero up to the total number of subcarriers N. FIG. 6 illustrates the outcome of this step.

A subsequent inverse DFT of length N 35 delivers the time-domain SC-FDMA symbols as in prior art. Appropriate padding with zeros is observed prior to performing the N-point IDFT. Finally, insertion of the cyclic prefix 36 completes the baseband SC-FDMA symbol in the time domain.

The single carrier nature of the uplink modulation is not compromised as the time-domain signal comprises an up-sampled, frequency-shifted version of the original repeated complex symbols. Apart from the required frequency shift, which manifests itself in the time domain as a complex weighting factor, the final uplink signal constitutes an up-sampled version of the original information containing the repeated complex symbols, and the transmission will be characterized by the same low PAPR.

The null subcarriers in transmission will not be exploited for other users as happens in standard interleaved SC-FDMA operation, where the spectrum occupied by each user is interleaved across the system bandwidth [8]. Instead, they will be explicitly reserved with the intention to aid the receiver 172 in detecting signals with possibly large frequency offsets.

The final N-point IDFT of block 35 in FIG. 3 deserves further attention. Prior to subcarrier mapping, the spectrum in FIG. 5 has a sampling period of L subcarriers according to the repetition factor. If N is a multiple of L, after padding with zeros the spectrum will show up the same sampling period L in the frequency domain, and after the length-N IDFT the signal will comprise L repetitions in the time domain. However, if N is not a multiple of L then the new sampling period L'will be given by the expression:

$$L'=gcd(L,N),$$

where gcd stands for the greatest common divisor. Choosing values of L that are also a submultiple of N ensures that the repetition pattern is maintained when up-sampling the signal after the length-N IDFT. This characteristic will be exploited by the receiver 172 for increased robustness against large frequency offsets. If L and N are primes then L' is equal to 1, and the signal in the time domain will not comprise any repetitions after the IDFT.

Figure 7:
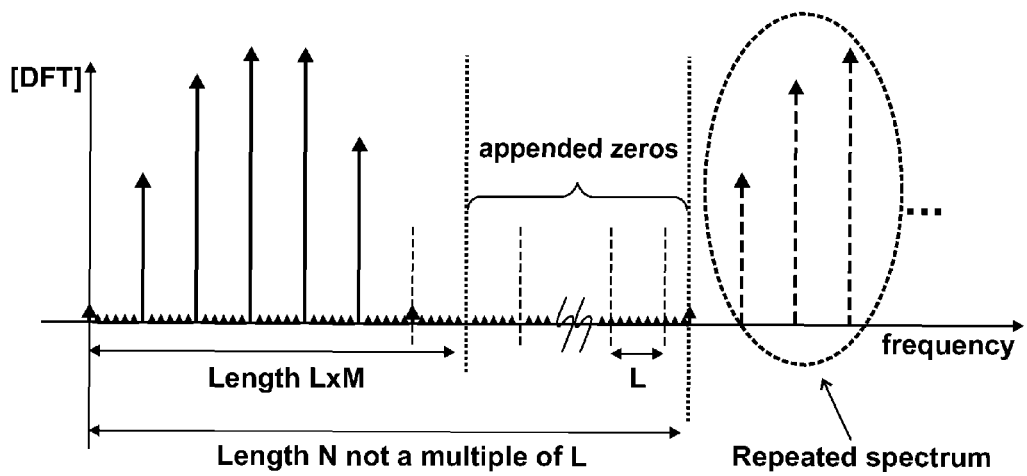
FIG. 7 is an example showing an N-point spectrum when L is not a submultiple of N, for the case L'=L/2.
Figure 7:
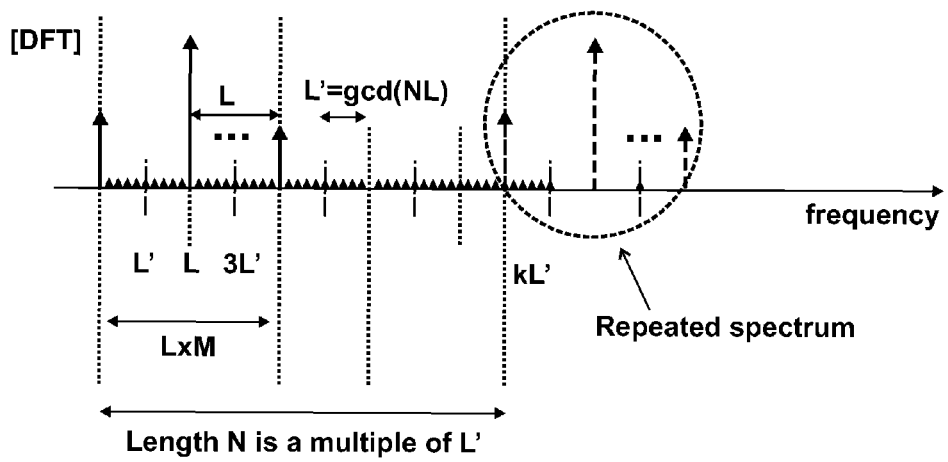

FIG. 7 shows the N-point spectrum in the case that L is not a submultiple of N. The spectrum can be viewed as being sampled with a period L'=gcd(L,N)<L, and in the time domain this results in a visible repetition of L'<L blocks of samples. The figure shows the particular case of L'=L/2 for a better understanding.

Figure 8:
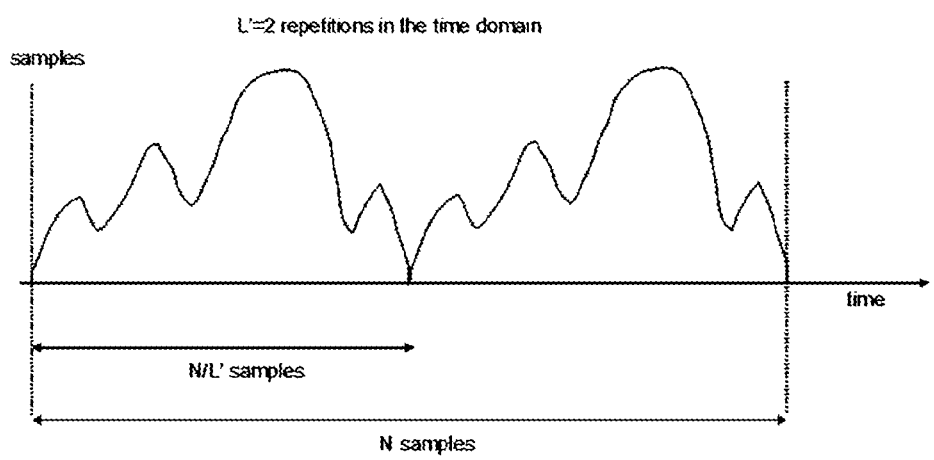
FIG. 8 is an example of a time-domain signal structure when L is not a submultiple of N (case of L'=2).

FIG. 8 shows the expected structure of the time-domain signal after the N-length IDFT, illustrated for the specific case of L'=2. The signal comprises two repetitions of N/2 samples in a given symbol. Repetitions in the time domain will be exploited by the receiver 172 for increased protection against large frequency offsets. Therefore it is desirable that L' is as close as possible to L.

The above described procedure in transmission is independently performed for each SC-FDMA symbol.

Detailed Receiver Chain

Figure 9:
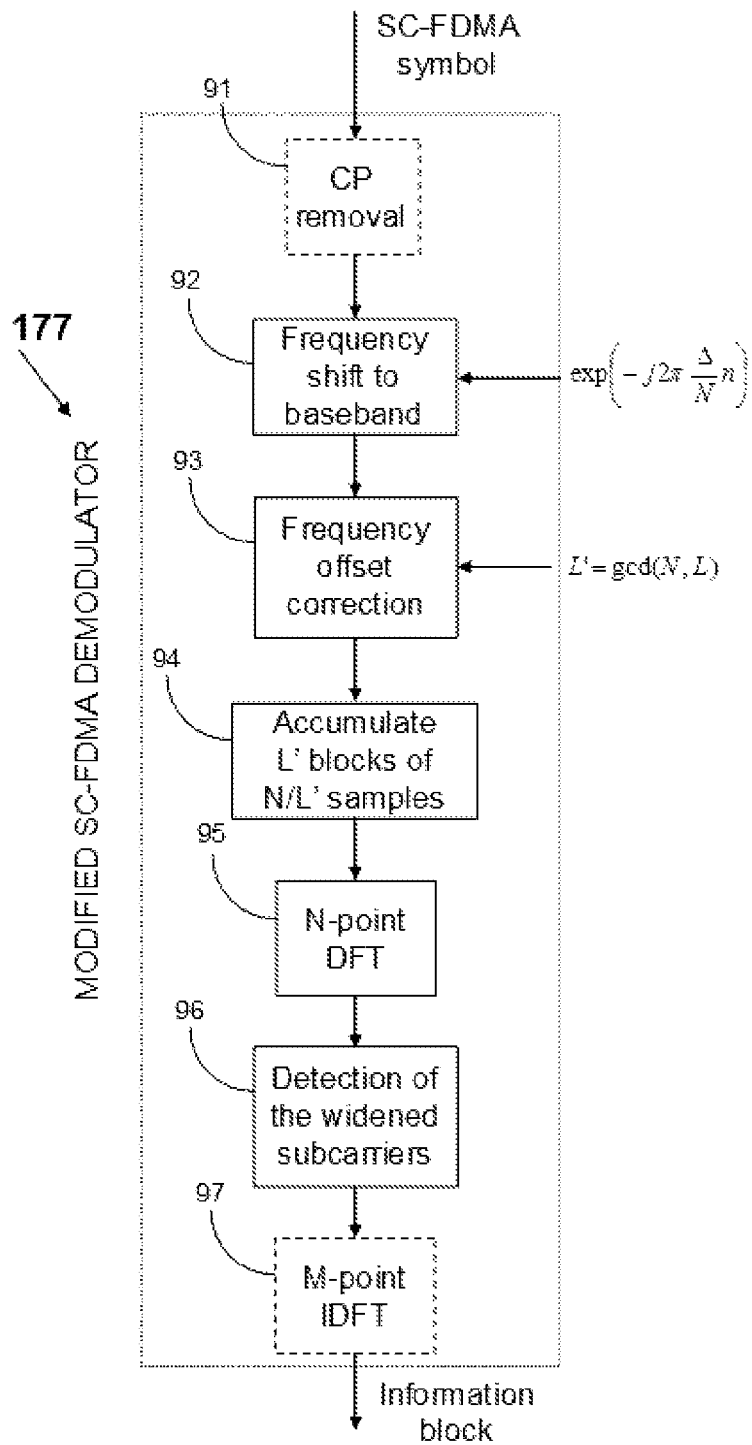
FIG. 9 illustrates the proposed modified receiver chain for MTC devices.

In order to exploit the increased SNR of the transmit spectrum and the presence of null subcarriers, instead of simply performing an N-point DFT to capture the frequency components, the receiver 172 will perform the processing steps illustrated in FIG. 9. Solid lines are used for the new proposed processing blocks, and dashed lines correspond to prior-art processing steps.

The first step is similar to standard SC-FDMA operation, where the cyclic prefix is discarded 91. Then, the frequency components of the received SC-FDMA symbol are translated to baseband 92, by multiplying the samples in the time domain by a factor w[n] given by:

$$w[n] = \exp\left(-j2\pi\frac{\Delta}{N}n\right),$$

where Δ represents the difference between the centre of uplink resources and the DC subcarrier (measured as a number of subcarriers in the digital domain); n is the index of the digital samples in the time domain; and N is the length of the SC-FDMA symbols. After that, the greatest common divisor of the SC-FDMA symbol length N and the number of repetitions L are calculated, which will be denoted as L' or "widening factor": L'=gcd(L,N), where gcd stands for the greatest common divisor operation. L' is the number of repetitions that will be observable in the time-domain SC-FDMA symbol after appropriate frequency shift to baseband. The time-domain SC-FDMA symbol constitutes a length-N, up-sampled version of the original repeated complex symbols prior to transmission. If N is an integer multiple of L then such repetition pattern will be observable after the N-point IDFT. However, if N is not an integer multiple of L then the number of repetitions will be equal to gcd (L, N), as it corresponds to the minimum sampling period in the frequency domain.

Figure 10:
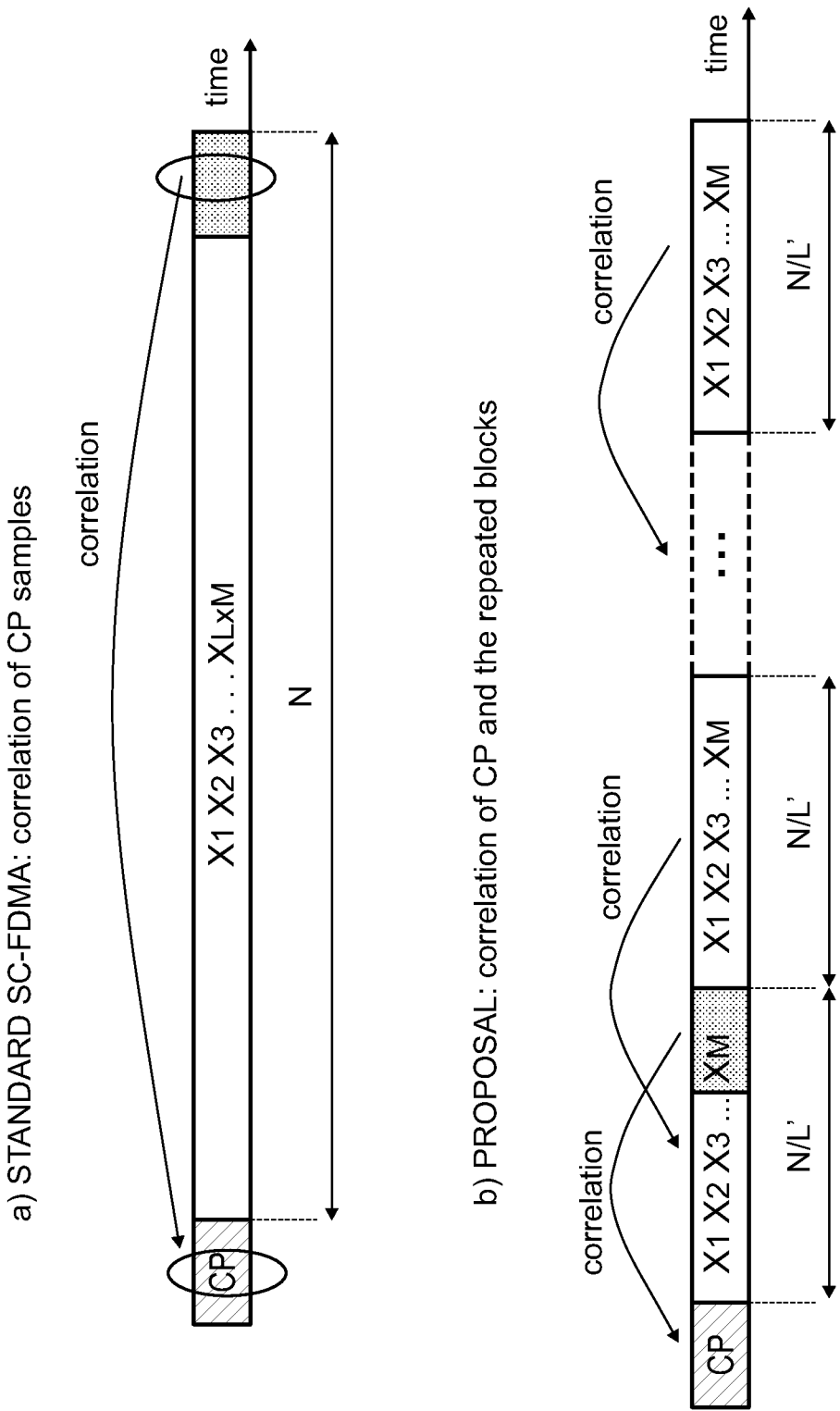
FIG. 10 is an example of the correlations for frequency offset estimation; a) prior art; b) proposed in this invention.

The L' blocks of N/L' samples will offer increased protection against large frequency offsets between transmitter 171 and receiver 172, because each block can be viewed as an SC-FDMA symbol with reduced length. Given that the frequency offset introduces a progressive phase factor of the form $$\exp\left(j2\pi\Delta f_{off}\frac{n}{N}\right),$$

where $\Delta f_{off}$ is the frequency offset, it is possible to estimate the frequency offset in the digital domain from the expression:

$$\hat{\Delta f}_{off} = -\frac{L'}{2\pi}\text{Phase}\left\{\sum_{n=0}^{CP+N-N/L'-1} r[n]r^*[n+N/L']\right\},$$

where $\hat{\Delta f}_{off}$ is the estimated frequency offset, r[n] represents the received samples in the time domain, CP is the length of the cyclic prefix and * denotes the conjugation operation. It is apparent that the sum is performed over most part of the received symbol, and therefore the frequency offset estimation is greatly improved compared to prior art techniques where the sum can only be applied over the cyclic prefix length [12]. This is illustrated in FIG. 10, where correlations are performed with the aid of the cyclic prefix and the L' repeated blocks as opposed to prior art where only the cyclic prefix can be exploited.

The resolvable phases is in the interval [−π, π] and it results in a maximum allowable frequency offset $\Delta f_{off,max}$ given by the expression:

$$\Delta f_{off,max} = \pm L' \times \frac{\Delta f}{2}.$$

Thus the largest frequency offset is increased by a factor L'compared to prior art techniques. Frequency offset correction 93 can thus compensate for frequency offsets up to L' times those in standard SC-FDMA and OFDM.

Figure 11:
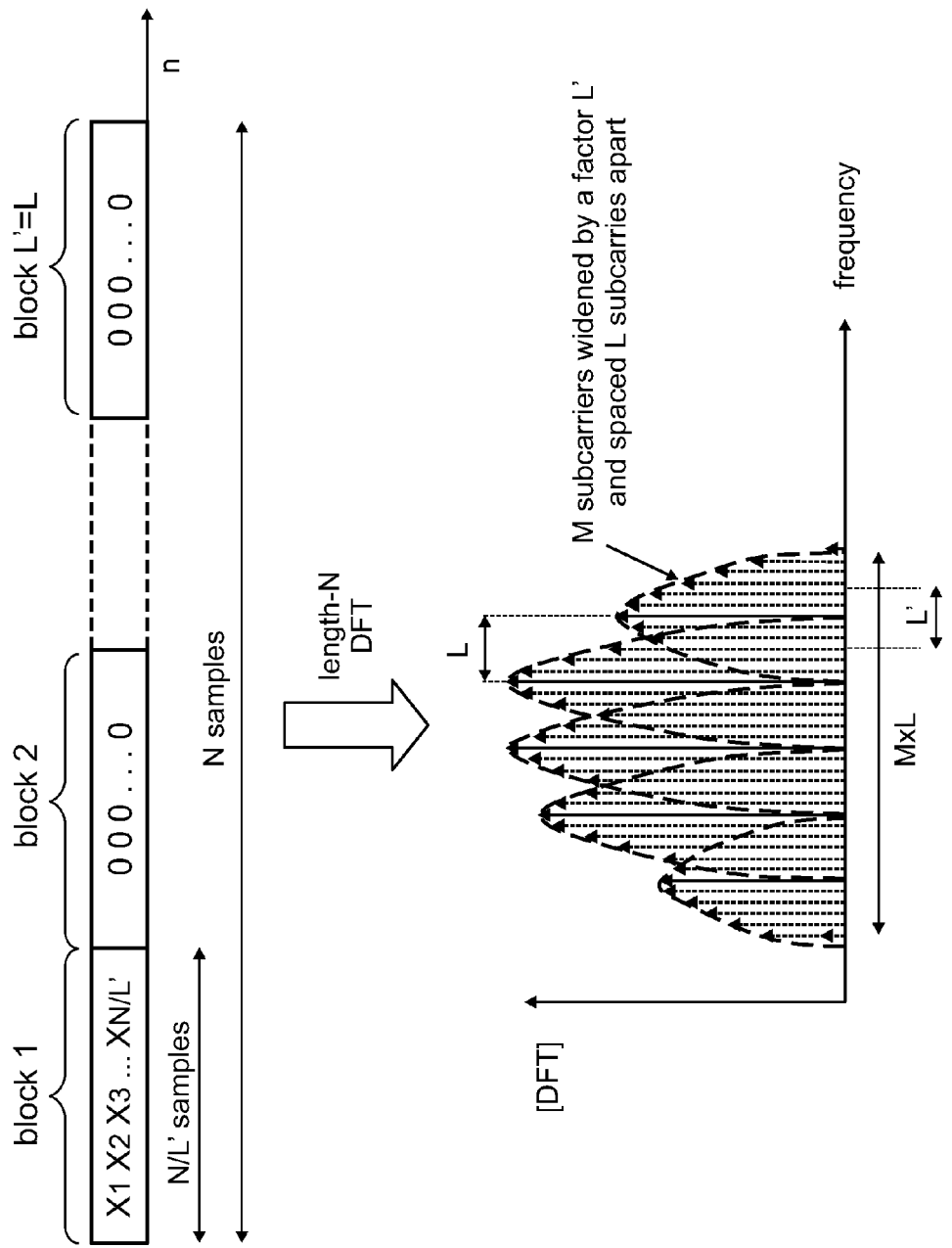
FIG. 11 is an example of a subcarrier widening observed upon reception after the N-point DFT, when L'=L.

In next step the first N/L' samples of the symbol are taken and successively accumulated with the second, third, etc. subsequent blocks of N/L' samples, up to the L'-th block 94. The L' blocks comprise identical samples in the time domain after frequency correction and translation to baseband, and can thus be reinforced for improved detection. The resulting N/L' samples are then completed with the necessary zeros prior to performing an N-point DFT 95. The output spectrum will be an oversampled version of the original spectrum at the transmitter 171 side, with the non-null subcarriers being replaced by widened sinc-like subcarriers (with Dirichlet kernel shapes) with a widening factor given by L'. FIG. 11 illustrates the subcarrier widening effect observed after performing the N-point DFT, for the case L'=L. In this case the subcarrier widening is equal to the spacing between them and the maximum possible robustness against large frequency offsets is achieved.

Figure 12:
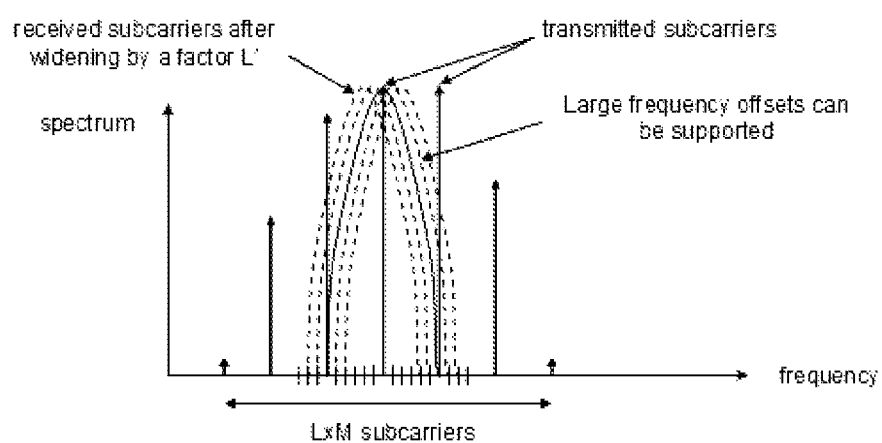
FIG. 12 illustrates the increased protection against large frequency offsets obtained from the widening effect according to the invention.
Figure 13:
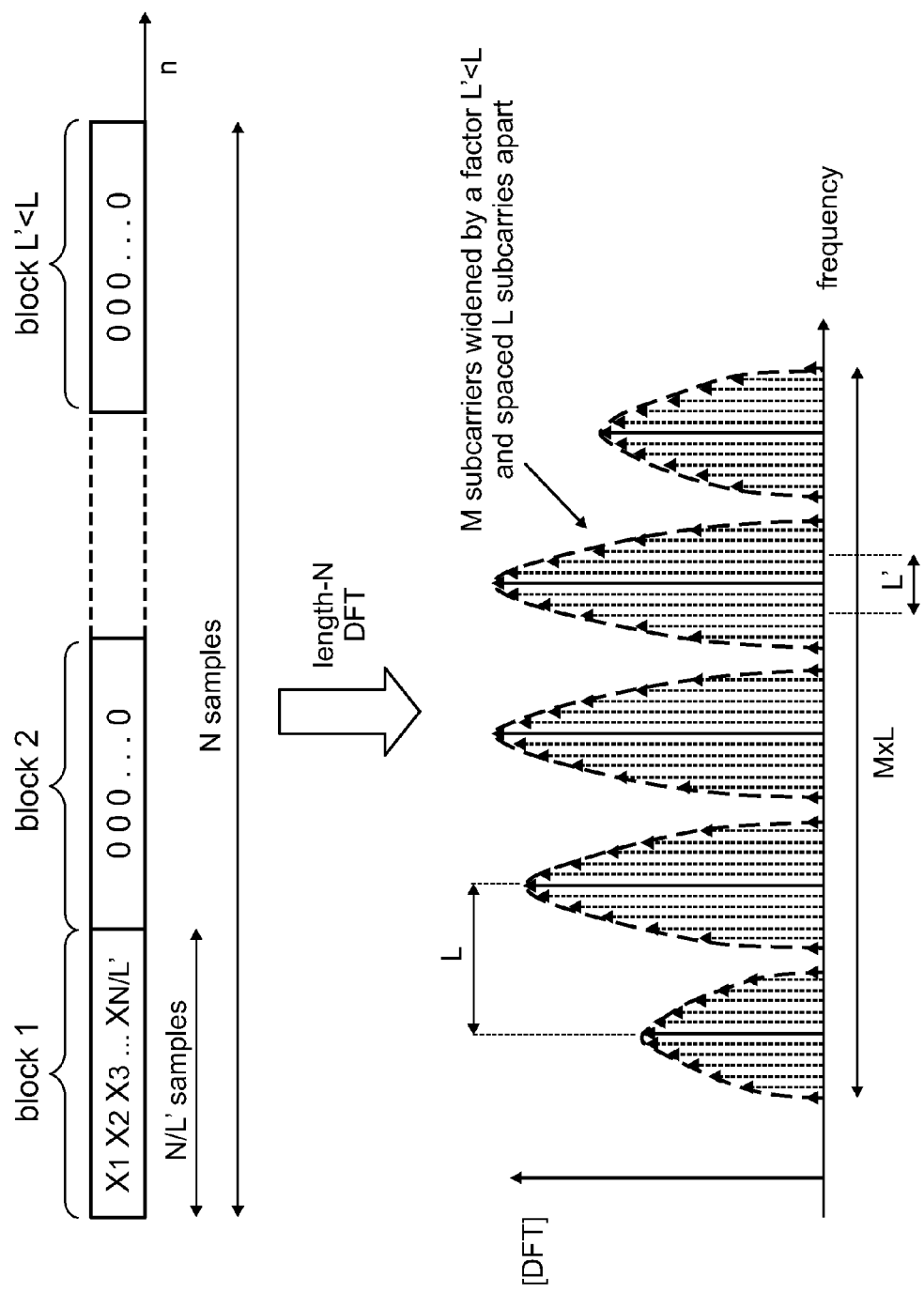
FIG. 13 is an example of a subcarrier widening observed upon reception after the N-point DFT, when L'<L

FIG. 12 illustrates in the frequency domain the additional protection brought by the subcarrier widening effect. Offsets up to several integer subcarriers can easily be compensated thanks to the increased resolution obtained from the widening effect, up to ±L'×Δf/2. FIG. 13 shows the described subcarrier widening effect when L'<L. In this case the maximum tolerable frequency offset is lower, although the energy of the widened subcarriers remains the same. It is therefore desirable that L' is as close as possible to L. It is important to highlight that the total power of the widened subcarriers after the N-point DFT remains L times that without repetition, thus improving uplink detection by 10×log(L) dB.

Figure 14:
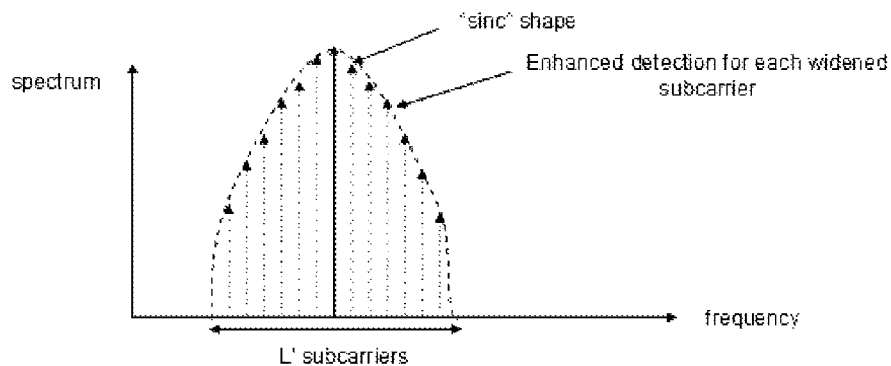
FIG. 14 illustrates the detection of the complex widened subcarrier amplitudes according to the invention.

Once obtained the accumulated spectrum, the receiver 171 can perform suitable detection of the widened subcarriers in the frequency domain 96. FIG. 14 shows detection over a single widened subcarrier, taking advantage of the known sinc-like shape and the increased subcarrier width. The wider the subcarriers, the easier will be to detect the complex amplitudes due to smoother frequency response. Any suitable procedure for extracting the complex subcarrier amplitudes can be applied without departure from the ideas proposed in this invention. Finally, after detecting the subcarriers in the frequency domain, an inverse M-point DFT can be performed on the detected complex amplitudes as in standard SC-FDMA demodulation (with M being the number of complex transmitted symbols disregarding the repetition operation), and the original information is thus recovered 97.

The increased energy and enhanced robustness against large frequency offsets can be exploited as described above at the cost of a reduced bit rate for a given amount of spectrum. However this is not a serious drawback for MTC, as MTC devices 171 are characterized by very low data rates and high latencies. Rather, the main challenge is to effectively increase coverage (due to reduced transmit powers) and robustness against frequency offsets (due to poor local oscillators) without compromising the single carrier nature of the uplink modulation. The proposed invention allows for a variety of situations by playing with the repetition factor L, the number of scheduled subcarriers and the widening factor L'.

Choice of the Number of Repetitions L

The number of repetitions L is chosen by the base station 172 according to two principles:

1. L must always be an integer submultiple of the number of scheduled subcarriers in uplink for this invention to be applicable. The larger the repetition factor, the larger the energy concentration of the resulting uplink spectrum, which in turn results in greater coverage according to the expression:

$SNR_{repetition} = L \times SNR_{no\_repetition}$.

However with large values of L the amount of information to be transmitted in a given spectrum will be reduced accordingly.

2. L also determines the maximum allowed frequency offset in reception according to the expression:

$$|\Delta f_{off,max}| = gcd(N, L) \times \frac{\Delta f}{2}.$$

It is therefore desirable that L is a submultiple of N so that L'=L:

$$L' = gcd(N, L) = L \Rightarrow |\Delta f_{off,max}| = L \times \frac{\Delta f}{2}.$$

The two above conditions are the drivers for selection of L in a practical situation. Depending on the available resources, the amount of information to be transmitted, the pursued coverage enhancement and the foreseen frequency offset at the transmitter 171, the base station 172 may choose the most suitable value of L and indicate it to the MTC device 171 when signalling the required uplink format. Sometimes the two above conditions represent conflicting requirements, as the maximum value of L which is a submultiple of the number of scheduled uplink subcarriers may not be a submultiple of N, so the base station must prioritize one or the other criterion depending on the MTC capabilities. In order to do so, the MTC device 171 can indicate its preferences upon initial access to the network, as an indication of preferred and/or supported L values, minimum bit rate requirements or maximum expected frequency offset, among others. Once chosen a given value of L, the MTC device 171 must be informed by means of a proper scheduling message from the base station 172 containing the uplink formats to be used. Different MTC devices will in general require different values of L according to their device capabilities and relative positions in the cell.

Upon initial access the device 171 can include an indication of MTC capabilities, for example in the form of specific fields within the radio access capabilities information, which in turn can also be retrieved from other network nodes for subsequent accesses. Additionally, the device 171 may include a list of preferred and/or supported L values for consideration by the base station 172, and/or an indication of "large frequency offset" due to poor expected frequency behaviour.

Figure 15:
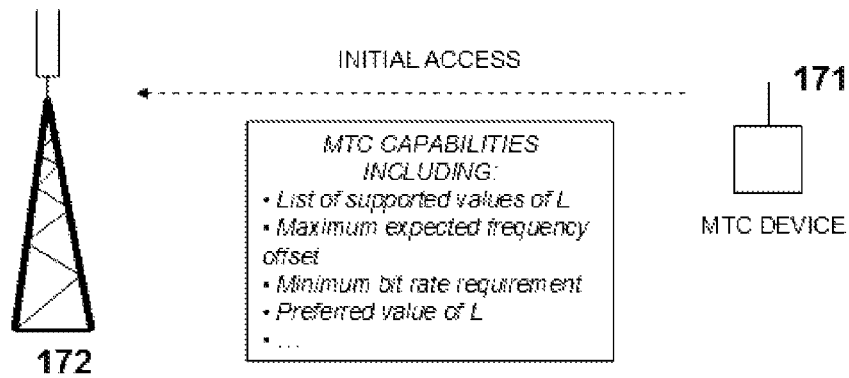
FIG. 15 illustrates an exemplary procedure where an MTC device includes an "MTC capabilities report" upon initial access indicating, among others, a list of supported values of L according to an embodiment.

FIG. 15 shows an exemplary procedure where an MTC device 171 includes means 167 for reporting an "MTC capabilities report" to the base station 172 indicating among others a list of supported values of L, the maximum expected frequency offset, the minimum bit rate requirements and/or an estimation of the most suitable value of L obtained from initial access to the cell. Other contents are not precluded.

Figure 16:
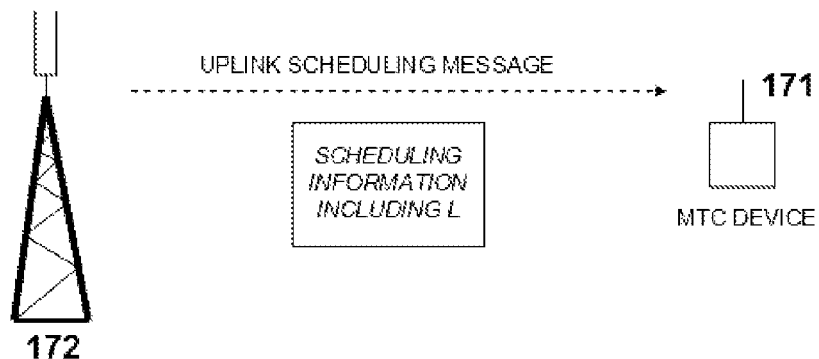
FIG. 16 illustrates the uplink scheduling grant message reported by the base station in response to the received report of FIG. 15, which includes the value L to use by the MTC device.

Once scheduled a set of uplink resources, the base station 172 informs the device 171 of the chosen repetition factor L as part of the uplink scheduling messages, as shown in FIG. 16. This value should be chosen by the base station 172 taking into account the supported L values from the device 171, the desirable coverage enhancement, the minimum bit rate requirements and the frequency offset characteristics of the device.

Figure 17:
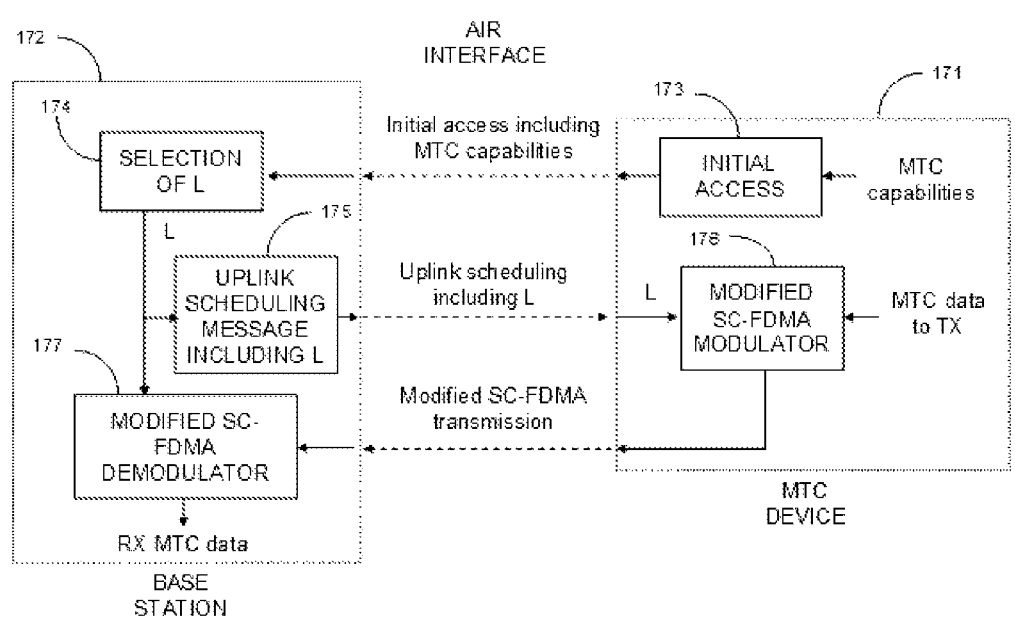
FIG. 17 is a preferred embodiment of the present invention for increasing coverage and robustness against frequency offsets in a wireless network.

With reference to FIG. 17 it is illustrated an exemplary embodiment of the invention, where an MTC device 171 tries to communicate with a base station 172 in such a way that improved uplink coverage and robustness against large frequency offsets are intended. The device 171 performs initial access to the cell 173 and includes, as part of any suitable control message, an indication of MTC capabilities to the base station 172. MTC capabilities at the device 171 may include, among others: supported values of L, minimum bit rate, expected coverage enhancement, expected frequency offset, and/or estimated value of L, but not precluding other suitable indications. Block 174 in the base station 172 then chooses a suitable value of L taking into account the information received from the device 171 and other considerations, like e.g. the amount of available resources in uplink. This value of L is then included as part of the uplink scheduling message 175 which is delivered to the MTC device 172. The modified SC-FDMA modulator 176 in the device 171 receives the value L to use, and delivers the MTC data to the air interface through the modified SC-FDMA modulation process described in the present invention, for increased coverage and frequency offset robustness. The modified SC-FDMA transmission is received by the Modified SC-FDMA demodulator 177 in the base station 172, which demodulates it according to the present invention and receives the MTC data even in very poor conditions or large frequency offsets. The chosen value L will determine the attainable coverage enhancement and maximum allowed frequency offset in each practical situation.

The previous exemplary embodiment can be applied to any wireless communications system intended for machine-type communications and employing SC-FDMA modulation, such as LTE but not precluding other wireless technologies. Modifications of the described invention can be devised by people skilled in the art in order to adapt it to the specifics of each technology, without departure from the fundamental ideas described here.

The invention can be implemented as a collection of software elements, hardware elements, firmware elements, or any suitable combinations of them. That is, the method according to the present invention is suitable for implementation with aid of processing means, such as computers and/or processors. Therefore, there is provided a computer program, comprising instructions arranged to cause the processing means, processor, or computer to perform the steps of any of the claims of the method of the first aspect. The computer program preferably comprises program code which is stored on a computer readable medium (not illustrated), which can be loaded and executed by a processing means, processor, or computer (not illustrated also) to cause it to perform the method.

The scope of the invention is defined in the following set of claims.

The invention claimed is:

1. A method for increasing coverage and robustness against frequency offsets in wireless networks, wherein at least one user device wirelessly communicates with at least one base station through a wireless network employing a Single Carrier-Frequency Division Multiple Access, SC-FDMA, the method comprising:
applying, by said at least one user device a number of calculated repetitions of a block of complex information symbols prior to a SC-FDMA modulator said number of repetitions being an integer submultiple of a number of subcarriers scheduled for uplink transmission according to the expression:

$N_{sc}^{UL} = L \times M$ with $L$ and $M$ integers, where $N_{sc}^{UL}$ is said number of subcarriers scheduled for uplink transmission, L is said number of repetitions and M is said number of complex information symbols; and
applying, by said at least one user device when mapping to scheduled resources in the SC-FDMA modulator a frequency shift equal to a subcarrier width multiplied by one half of said number of repetitions.

2. The method according to claim 1, wherein the greatest common divisor of said number of repetitions and the SC-FDMA symbol length is maximized according to the expression:

gcd(N,L) is maximized, where L is said number of repetitions, N is the SC-FDMA symbol length and gcd is the greatest common divisor operation.

3. The method according to claim 2, wherein said at least one base station comprises performing the following steps for detecting a time-domain received signal from the user device:
applying a frequency shift over said received time-domain signal by multiplying the latter with a complex factor w[n] given by:

$$w[n] = \exp\left(-j2\pi\frac{\Delta}{N}n\right),$$

wherein:
Δ is the frequency difference between the centre of uplink resources and the central DC subcarrier, said difference being measured as a number of subcarriers in the digital domain,
n is the index of the digital samples in the time domain, and
N is the length of the SC-FDMA symbols;
calculating a widening factor L' given by:

$L' = gcd(L,N)$, where gcd is the greatest common divisor operation, L is the number of repetitions and N is the length of the SC-FDMA symbols;
dividing the received SC-FDMA symbol into L' identical blocks of N/L' samples each, and estimating a frequency offset in the digital domain from the expression:

$$\Delta\hat{f}_{off} = -\frac{L'}{2\pi}\text{Phase}\left\{\sum_{n=0}^{CP+N-N/L'-1} r[n]r^*[n+N/L']\right\},$$

and with a maximum allowed frequency offset:

$$\Delta f_{off,max} = \pm L' \times \frac{\Delta f}{2},$$

where $\Delta\hat{f}_{off}$ is the estimated frequency offset, $\Delta f_{off,max}$ is the maximum allowed frequency offset, r[n] represents the received samples in the time domain, CP is the length of the cyclic prefix, Δf is the subcarrier width and * denotes the conjugation operation;
summing together the time-domain samples corresponding to said L' blocks of N/L' samples to form a single block of N/L' samples with improved detection characteristics;
padding said single block of N/L' samples with the necessary zeros to perform an N-point discrete Fourier transform;
detecting the complex amplitudes of the widened subcarriers in the frequency domain; and
performing an inverse M-point discrete Fourier transform of said detected complex amplitudes of the widened subcarriers to obtain the original M complex information symbols.

4. The method according to claim 1, wherein said wireless network comprises at least a Long-Term Evolution network.

5. The method according to claim 1, wherein said number of repetitions L is calculated by the at least one base station and reported to the at least one user device by means of a specific control message or as a part of an existing control message.

6. The method according to claim 5, wherein the at least one user device further sends a list of supported values of said number of repetitions L to the at least one base station as part of an initial access to the wireless network.

7. The method according to claim 5, comprising reporting, by the at least one user device to the at least one base station, a preferred value of the number of repetitions L.

8. The method according to claim 5, comprising reporting, by the at least one user device to the at least one base station, a maximum expected frequency offset.

9. A method according to claim 5, comprising reporting, by the at least one user device to the at least one base station, a minimum bit rate requirement.

10. A user device, said user device being configured to wirelessly communicate with at least one base station through a wireless network employing a Single Carrier-Frequency Division Multiple Access, SC-FDMA, the user device comprising:

means for applying a number of calculated repetitions of a block of complex information symbols prior to a SC-FDMA modulator, said number of repetitions being an integer submultiple of a number of subcarriers scheduled for uplink transmission according to the expression:

$N_{sc}^{UL} = L \times M$ with $L$ and $M$ integers, where $N_{sc}^{UL}$ is said number of subcarriers scheduled for uplink transmission, L is said number of repetitions and M is said number of complex information symbols; and means for applying, when mapping to scheduled resources in the SC-FDMA modulator, a frequency shift equal to a subcarrier width multiplied by one half of said number of repetitions, so that coverage of the user device in the wireless network and frequency offset robustness against frequency offsets is increased.

11. The user device according to claim 10, further comprising means for receiving from the at least one base station, through a specific control message or as a part of an existing control message, said number of calculated repetitions L.

12. The user device according to claim 10, further comprising means for reporting to the at least one base station a preferred value of said number of repetitions L, a maximum expected frequency offset and/or a minimum bit rate requirement.

13. The user device according to claim 10, comprising a Machine-Type Communications device, MTC.

14. A computer program product, which includes code instructions that when executed in a computer implement the steps of the method of claim 1.

* * * * *